United States Patent [19]

Anderson

[11] Patent Number: 5,708,500

[45] Date of Patent: Jan. 13, 1998

[54] MULTIMODE OPTICAL TIME DOMAIN REFLECTOMETER HAVING IMPROVED RESOLUTION

[75] Inventor: Duwayne R. Anderson, Redmond, Oreg.

[73] Assignee: Tektronix, Inc., Wilsonville, Oreg.

[21] Appl. No.: 794,714

[22] Filed: Feb. 4, 1997

[51] Int. Cl.$^6$ .................................................. G01N 21/88
[52] U.S. Cl. .................................. 356/73.1; 250/227.15
[58] Field of Search .................... 356/73.1; 250/227.15, 250/227.16

[56] References Cited

U.S. PATENT DOCUMENTS

| | | | |
|---|---|---|---|
| 5,008,535 | 4/1991 | Anderson et al. | 250/358.1 |
| 5,155,439 | 10/1992 | Holmbo et al. | 324/534 |
| 5,365,328 | 11/1994 | Anderson | 356/73.1 |
| 5,528,356 | 6/1996 | Harcourt | 356/73.1 |

*Primary Examiner*—Vincent P. McGraw
*Attorney, Agent, or Firm*—William K. Bucher

[57] ABSTRACT

A multimode optical time domain reflectometer has first and second wavelength optical transmitters for launching optical pulses into a fiber under test and optical receivers responsive to the respective wavelengths for converting the optical return signals from the test filer into electrical signals for acquiring waveform data representative of the optical return signals at the respective wavelengths. A processor receives the waveform data and determines a difference in fiber slopes between the optical return signal at the respective wavelengths and adds the fiber slope difference to the waveform data of the second optical return signal for producing composite waveform data having a uniform fiber slope for the waveform data acquired at the first and second wavelengths. A multimode optical time domain reflectometer of this design provides improved two point resolution for 1310 nm testing of multimode optical fiber.

13 Claims, 5 Drawing Sheets

MULTIMODE OPTICAL TIME DOMAIN REFLECTOMETER HAVING IMPROVED RESOLUTION

BACKGROUND OF THE INVENTION

The present invention relates generally to optical time domain reflectometers and more specifically to a multimode optical time domain reflectometer having improved resolution by generating composite waveform data using waveform data acquired at two different wavelengths.

A traditional optical time domain reflectometer (OTDR) tests an optical fiber by launching optical pulses at a particular wavelength into the fiber under test and acquiring waveform data to represent a display trace of the fiber. The OTDR, under operator control, determines the portion of the test fiber to be examined, the pulse width and wavelength of the optical pulses to be launched into the test fiber, the sample density or spacing between acquired data points, the amount of averaging for each acquired data point, and the like. A series of optical pulses are launched into the test fiber. During the period between each test pulse, a return reflected optical signal in the form of Rayleigh scattering and reflections due to mechanical spices, connector, and the like is received, converted to an electrical signal and sampled in accordance with the preselected sample density. The acquired waveform data is stored in memory and further processed to locate and measure events on the test fiber. When using this technique, a trade off must be made between resolution and dynamic range. The resulting acquired waveform consists of a series of evenly spaced, constant sample spacing data points that are easily displayed on a display screen of the OTDR. An example of the above described optical time domain reflectometer is the TFP2 Optical Time Domain Reflectometer manufactured and sold by Tektronix, Inc., Wilsonville, Oreg., the assignee of the present invention.

Another method of acquiring waveform data in an optical fault locator type OTDR instrument is described in U.S. Pat. No. 5,155,439, assigned to the assignees of the present invention, and incorporated herein by reference. The optical fault locator launches optical pulses into a test fiber at a first pulse width. The return reflected optical signal is converted to an electrical signal, digitized, stored and processed to locate anomalous events in the fiber. Any region of the test fiber having an anomalous event is reexamined rising optical pulses having a pulse width optimized for the that region of the fiber. A symbolic display is used to indicate the location and type of event located in the fiber instead of the traditional waveform trace.

U.S. Pat. No. 5,528,356, assigned to the assignees of the present invention, describes the latest innovation in acquiring and displaying OTDR waveform data. The OTDR contains algorithms for automatically determining the optimum system parameters, such as pulsewidth, sample spacing, and the like, for acquiring the waveform data over various segments of the fiber under test. Waveform data is acquired over the various segments and the segmented waveform data is processed to produce a composite waveform trace on the OTDR display. An example of such an instrument is the TFS3031 mini-OTDR, manufactured and sold by the assignee of the present invention.

The TFS3031 includes an optional multimode optical deck having multimode lasers operating at wavelengths in the range of 850 nm and 1310 nm. The output of the lasers are coupled into an output port on the instrument for testing multimode fibers at one or the other wavelengths. The return reflected light from the multimode fiber under test is coupled to a photodetector, which converts the light into an electrical signal. A silicon avalanche photodetector (APD) is used for return reflected light generated using the 850 nm laser and a germanium or InGaAs APD is used for return reflected light generated using 1310 nm laser. A large reflective event in the optical return signal momentarily generates a large amount of power that is detected by the OTDR optical receiver. It can take as much as one microsecond for the photodetector and preamplifier to recover from this pulse. This produces a long recovery region after the reflection. The signal distortion caused by the slow currents in photodetector is referred to as "tail" and is much more significant in Germanium and InGaAs avalanche photodetectors than in silicon photodetectors. Consequently, OTDRs that test at 1310 nm typically cannot identify and measure events closely following large reflective events. Attenuation dead zone or loss-measurement resolution is used to describe the performance of an OTDR in this respect. OTDRs that test at 850 nm and use silicon detectors have considerably better "tail" characteristics than either germanium or InGaAs detectors, allowing the 850 nm OTDR to achieve much better loss-measurement resolution. In addition, silicon detectors have higher gain and better signal-to-noise ratio than germanium or InGaAs detectors.

A fundamental characteristic of Rayleigh scattering is that is it inversely proportional to the forth power of the wavelength. As a result of this wavelength sensitivity, shorter wavelengths of light are scattered more strongly than longer ones. Typical loss for multimode fibers at 1300 nm is 0.5 dB/km and 2.4 dB/km at 850 nm. Because of this fundamental characteristic, many multimode fiber installations operate at 1300 nm. This requires multimode OTDRs to operate at 1300 nm wavelength in order to have a sufficient measurement range to evaluate the fiber in these systems. However longer launch pulsewidths are necessary to achieve this greater measurement range. This limits the two point resolution of the instrument for identifying closely spaced reflective events and combines with detector "tail" to increase the dead zone. Event resolution or event dead zone is used to describe the performance of an OTDR in this respect. OTDRs operating at 850 nm generally use narrower optical pulses, which provides better two point resolution than OTDRs operating at 1300 nm using wider pulsewidths.

What is needed is a multimode OTDR that achieves the measurement range associated with 1300 nm multimode OTDRs while achieving greater attenuation dead zone two point resolution near the OTDR front end and greater event dead zone two point resolution over the measurement range associated with 850 nm multimode OTDRs.

SUMMARY OF THE INVENTION

Accordingly, an objective of the present invention is a dual wavelength multimode optical time reflectometer having improved two point resolution.

An additional object of the present invention is a dual wavelength multimode optical time domain reflectometer wherein the fiber slope difference is determined between two different wavelengths of the optical return signal from a fiber under test.

A further objective of the present invention is producing composite multimode waveform data having a uniform fiber slope using waveform data acquired at different wavelengths.

The present invention is directed to a multimode optical time domain reflectometer (OTDR) for launching optical pulses into a fiber under test for generating optical return signals from the test fiber for acquiring waveform data. The multimode OTDR includes an acquisition system and a processor for producing composite waveform data acquired at first and second optical transmitter wavelengths. In the preferred embodiment of the invention the respective optical transmitters operate in ranges of about 1300 nm and about 850 nm. The acquisition system acquires waveform data using the first and second multimode optical transmitters operating at the first and second wavelengths for launching optical pulses into the fiber under test to generate optical return signals corresponding to the first and second wavelengths of the launched optical pulses. First and second optical receivers, responsive to the respective wavelengths, convert the respective optical return signals into electrical signals representative of the optical return signals. In the preferred embodiment of the invention, the first and second optical receivers respectively include germanium or InGaAs avalanche photodetectors and silicon avalanche photodetectors. The processor receives the waveform data representative of the optical return signals at the first and second wavelengths for determining a difference in fiber slopes between the optical return signals at the first and second wavelengths and modifies the fiber slope of the second optical return signal by adding the difference between the fiber slopes to the waveform data of the second optical return signal for producing the composite waveform data having waveform data acquired at both the first and second wavelengths.

In one embodiment of the multimode OTDR of the present invention, the acquisition system acquires waveform data over a first waveform segment using the second optical transmitter wavelength and a second waveform segment using the first optical transmitter wavelength with each waveform segment being acquired using a different pulsewidth optical pulse, a different sample spacing and a different starting point. The processor adds the fiber slope difference to the waveform data of the first waveform segment for producing the composite waveform data having waveform data acquired at both the first and second wavelengths.

In a further embodiment of the multimode OTDR of the present invention the processor evaluates the waveform data at the first wavelength for determining an approximate location of at least one anomalous event in the fiber under test for providing acquisition parameters to the acquisition system for acquiring waveform data at the second wavelength over the anomalous event location and replacing the portion of the waveform data at the first wavelength with the modified waveform data at the second wavelength having the fiber slope difference added thereto for producing the composite waveform data having waveform data acquired at both the first and second wavelengths.

The multimode optical time domain reflectometer of the present invention further includes a display device coupled to a display controller for receiving and displaying the composite waveform data as a waveform trace on the display device.

The method of generating waveform data for displaying as a waveform trace on a display device in a multimode optical time domain reflectometer that launches optical pulses into a fiber under test for generating optical return signals from the test fiber includes the steps of acquiring waveform data representative of the optical return signals using first and second multimode optical transmitters operating at first and second wavelengths. The respective optical return signals are converted into electrical signals representative of the optical return signals using first and second optical receivers responsive to the respective wavelengths of the launched optical pulses. The waveform data representative of the optical return signals at the first and second wavelengths is processed for determining a difference in fiber slopes between the optical return signals at the first and second wavelengths. The fiber slope of the second optical return signal is modified by adding the difference between the fiber slopes to the waveform data of the second optical return signal for producing composite waveform data having waveform data acquired at both the first and second wavelengths.

The acquiring and processing steps may further include the steps of acquiring waveform data at the second wavelength over a first waveform segment using a first pulselength optical pulse, sample spacing and starting point, adding the fiber slope difference to the acquired waveform data at the second wavelength over the first waveform segment, and acquiring waveform data at the first wavelength over a second waveform segment using a different pulsewidth optical pulse, sample spacing and starting distance for producing the composite waveform data having waveform data acquired at both the first and second wavelengths.

In an alternative method of generating waveform data in a multimode optical time domain reflectometer according to the present invention, the acquiring and processing steps further include the steps of evaluating the waveform data at the first wavelength for determining an approximate location of at least one anomalous event in the fiber under test for providing acquisition parameters to the acquisition system, acquiring waveform data at the second wavelength over the anomalous event location, and replacing the portion of the waveform data over the anomalous event location acquired at the first wavelength with the waveform data over the anomalous event acquired at the second wavelength having the fiber slope difference added thereto for producing the composite waveform data having the uniform fiber slope for the waveform data acquired at the first and second wavelengths.

The method of generating waveform data in a multimode optical time domain reflectometer further includes the step of displaying the composite waveform data as a waveform trace on the display device.

The objects, advantages and novel features of the present invention are apparent from the following detailed description when read in conjunction with the appended claims and attached drawings.

DETAILED DESCRIPTION OF THE PREFERRED EMBODIMENT

Figure 1:
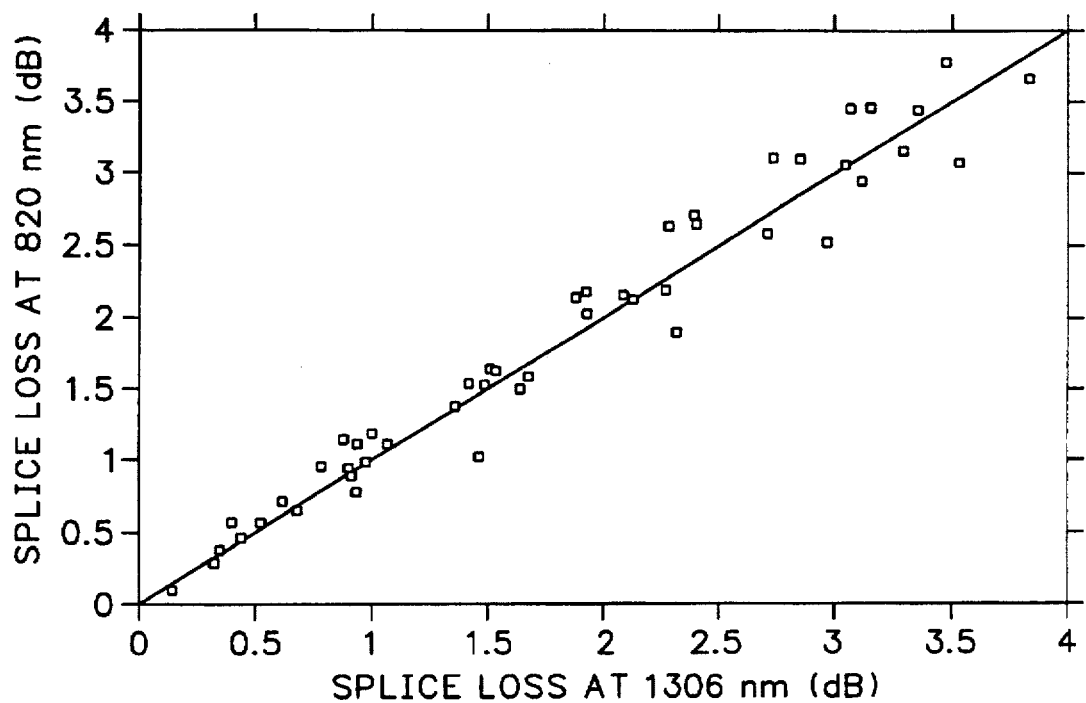
FIG. 1 is graph comparing slice losses at 1306 nm and 820 nm relating to the multimode optical time reflectometer according to the present invention.

The present invention is a multimode optical time domain reflectometer that provides a 1300 nm testing solution for multimode optical fiber systems that has significantly improved two-point resolution. Loss on multimode fibers depends on the mode field distribution, which in turn, depends on the location and type of events, as well as the launch conditions from the light source. The loss of connectors and splices on multimode fibers also show very little sensitivity to wavelength, even if there is bending of the fiber. Further, fiber loss or attenuation in optical fiber is dependent on wavelength whether it is single mode or multimode. This is because Rayleigh scattering is a major contribution to the fiber attenuation, and Rayleigh scattering is inversely proportional to the 4th power of the wavelength. Event loss, however, depends primarily on the modal distribution, and is essentially independent of the wavelength. FIG. 1 shows this important fact by comparing the OTDR measured loss at 1306 nm and 820 nm for several different types of splices. Misalignment includes longitudinal misalignment, lateral misalignment, and bending loss. The loss at 1306 nm and 820 nm correlates very well for splice losses less than a few tenths of a dB. Even for larger splice losses, the correlation is fairly good with the spread getting larger, but still centered about a best-fit line where the loss at 1306 nm equals the loss at 820 nm. The spread in splice loss is most likely due to the difficulty in maintaining the mode field distribution throughout the test.

The insensitivity of slice loss to wavelength provides a unique opportunity for improving the two point resolution of multimode OTDRs by generating composite waveform data of the return reflected signal from the multimode fiber under test using waveform data acquired in ranges of about 1300 nm and 850 nm wavelengths. The difference in fiber slope between the 1300 nm data and the 850 nm data is added to the 850 nm data to produce modified 850 nm waveform data having a fiber slope equivalent to the 1300 nm waveform data. The composite waveform data has the measurement range of data acquired at 1300 nm and the two point resolution near the front end of data acquired at 850 nm.

Figure 2:
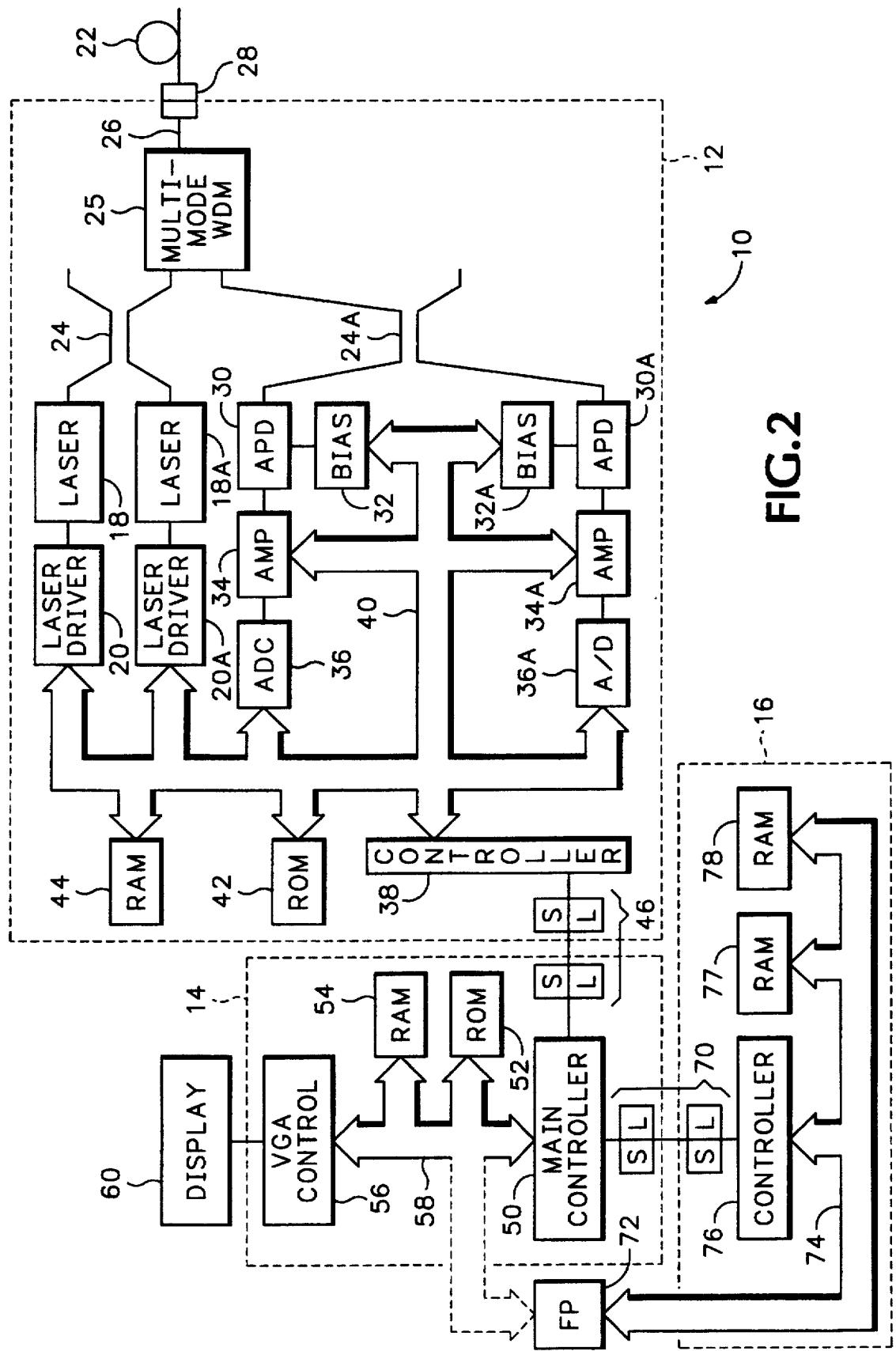
FIG. 2 is a block diagram of a multimode optical time domain reflectometer according to the present invention.

Referring to FIG. 2 there is shown a block diagram of a representative multimode optical time domain reflectometer, OTDR, 10 for acquiring and displaying composite waveform data acquired using optical pulses at two different wavelengths. The multimode OTDR 10 includes a digital acquisition section 12 (DAS), a main processing section 14, and a power supply section 16. The DAS 12 has first and second multimode transmitters 18 and 18A, such as laser diodes, that are intermittently energized by respective laser drivers 20 and 20A for launching interrogating pulses into a test fiber 22 via a directional coupler 24, a multimode wavelength division multiplexer (WDM) 25, and a launch fiber 26, which is connected to the multimode test fiber 22 by a connector 28. In the preferred embodiment of the present invention, optical transmitter 18 is a laser diode operating at a wavelength in the range of about 1300 nanometers and optical transmitter 18A is a laser diode operating at a wavelength in the range of about 850 nanometers. OTDR 10 receives return reflected light from the test fiber 22 due to Rayleigh backscattering and Fresnel reflections.

A portion of the return light received from the test fiber 22 is coupled through WDM 25, coupler 24A to photodetectors 30 and 30A, which generate current signals representative of the intensity of the return light. In the preferred embodiment photodetector 30 is a germanium or InGaAs avalanche photodetector responsive to the 1300 nm return reflected light from the test fiber 22 and photodetector 30A is a silicon avalanche photodetector responsive to the 850 nm return reflected light. The avalanche photodiodes 30 and 30A are respectively coupled to voltage biasing circuits 32 and 32A. The current signals from the respective APDs 30 and 30A are converted to voltage signals and amplified by respective variable gain transimpedance amplifiers 34 and 34A. The amplified voltage signals are respectively sampled and converted to a digital form by analog-to-digital converters (ADC) 36 and 36A. Alternately, the amplifiers 34 and 34A may be connected to a single ADC via a switch. The switch couples the respective outputs of the amplifiers 34 and 34A to the ADC depending on which optical transmitter 18 and 18A is used. A digital signal processor controller 38 controls the timing of the ADCs 36 and 36A relative to the laser drivers 20 and 20A, the voltage output of the voltage biasing circuits 32 and 32A, and the gain of the transimpedance amplifiers 34 and 34A via digital bus 40 in response to executable routines stored in ROM 42. ROM 42 and RAM 44 are also coupled to the bus 40. RAM 44 accumulates the digital data values in a data buffer from the ADCs 36 and 36A representative of the light intensity at selected points in the test fiber. Repetitive interrogations of the test fiber 22 provide additional digital data values at the selected points, which are averaged with previously stored values. RAM 44 also stores parameter data passed to the DAS 12 from the main processor section 14 via serial data link 46. The averaged data values in RAM 44 are transferred to the main processor section 14 via the serial data link 46.

The main processor section 14 includes a controller 50, such as a Motorola 68340 microprocessor, coupled to ROM 52, RAM 54 and a display controller 56 via digital bus 58. In the preferred embodiment the ROM 52 is downloadable flash EPROMs and the display controller 56 is a standard VGA type controller coupled to a 640×480 pixel array display device 60, such as a liquid crystal LCD display, cathode ray robe or other device having a rectangular array of addressable pixels. The ROM 52 contains control logic and waveform processing routines. RAM 54 includes a data buffer for receiving the waveform data from the DAS 12. RAM 54 also includes a video frame buffer for storing bit mapped data to be displayed on the display device 60.

The main processor section 14 is coupled via a serial link 70 to the power supply section 16. The power supply section 16 is coupled to OTDK 10 front panel 72 via digital bus 74. The power supply section 16 includes a controller 76 and associated control programs, stored in ROM 78, for providing power management and front panel control functions and RAM 77 for storing data related to the power management function. The controller 76 poles the front panel 72 to determine if one of the its buttons is pushed. Alternatively, the front panel may be provided with knobs as well as buttons. The controller 76 generates a key code based on the front panel activity and couples the key code to the controller 50 in the main processor section 14 via the serial link 14. The controller 50 generates the appropriate system signal request based on the key code. In the preferred embodiment, the OTDR 10 may be battery operated or coupled to a standard 110 volt AC voltage supply. When operating on a battery supply, the controller 76 monitors battery charging and battery usage and provides an indication of battery usage and remaining battery life. An alternative arrangement for OTDR 10 is to couple to the front panel 72 to the controller 50 of the main processor section 14 via digital bus 58.

The basic acquisition of waveform data using the above described OTDK 10 is described in U.S. Pat. No. 5,528,356, titled "Apparatus and Method for Displaying Multiple Sample Spacing Waveform Segments", assigned to the assignee of the present invention and incorporated herein by reference. The acquisition and display of waveform data is set-up using the front panel 72 user interface. The acquisition of waveform data is initiated by depressing a start/stop button on the front panel 72. In the commercial embodiment of the present invention, the acquisition of waveform data segments described in the '356 patent is modified by first acquiring waveform data representative of the return reflected light from the test fiber 22 using the optical transmitters 18 and 18A. The controller 50 accesses routines from ROM 52 for passing parameter information, such as wavelength, pulsewidth, sample spacing and starting distance, over the serial link 46 to the controller 38 in the DAS 12. The controller 38 accesses routines stored in ROM 42 for initiating the acquisition of waveform data at the wavelength designated in the parameter information, such as at the 1300 nm wavelength. Data points are acquired and averaged for the waveform data at the designated wavelength and stored in a buffer in RAM 44. Once the acquisition of the waveform data at the first wavelength is complete, the waveform data is passed back to the controller 50 over the serial link 46. The waveform data received from the DAS 14 is stored in a buffer in RAM 54. The controller 50 calls an event detection routine, such as described in U.S. Pat. No. 5,365,328 titled "Locating the Position of an Event in Acquired Digital Data at Sub-Sample Spacing", assigned to the assignees of the present invention and incorporated herein by reference, to determine the presence of and to characterize any event in the waveform data. The controller 50 passes new parameter information for acquiring waveform data at the other wavelength that includes pulsewidth, sample spacing and starting distance to the controller 38 in the DAS 12 via the serial link 46. The controller 38 accesses the routines stored in ROM 42 for initiating the acquisition of waveform data at the other wavelength designated in the parameter information, in this case the 850 nm wavelength. Data points are acquired and averaged for the waveform data at the designated wavelength and stored in the buffer in RAM 44. Once the acquisition of the waveform data at the second wavelength is complete, the waveform data is passed back to the controller 50 over the serial link 46. The waveform data received from the DAS 14 is stored in a buffer in RAM 54. The controller 50 calls the event detection routine to determine the presence of and to characterize any event in the waveform data.

The controller 50 calls a routine from ROM 52 for determining the difference in fiber slope between the waveform data acquired at the 1300 nm wavelength and the waveform data acquired at the 850 nm wavelength. This routine uses the data from the event detection routine for determining portions of the waveform data from each acquisition that are free of events and are part of the backscatter signal. The fiber slope difference is determined using the event-free backscatter data for the respective wavelengths and is stored in RAM 54 for adding to the waveform data acquired using the 850 nm wavelength laser 18A.

In the preferred implementation of the present invention, the calculated fiber slope difference is added to the waveform data previously acquired using the 850 nm laser. Alternately, the system processor 50 may initiate a new acquisition of waveform data using the 850 nm laser with the same or new parameter information and adds the fiber slope difference to the newly acquired data. Further, the invention may be implemented by acquiring only a portion of waveform segment data for each wavelength or only a portion of the waveform segment data for the waveform data acquired at the 1300 nm wavelength. The main criteria for the acquired data at the two wavelengths in determining the difference in fiber slope is locating portions in the respective acquired data that have no events and are on the backscatter.

Figure 3C:
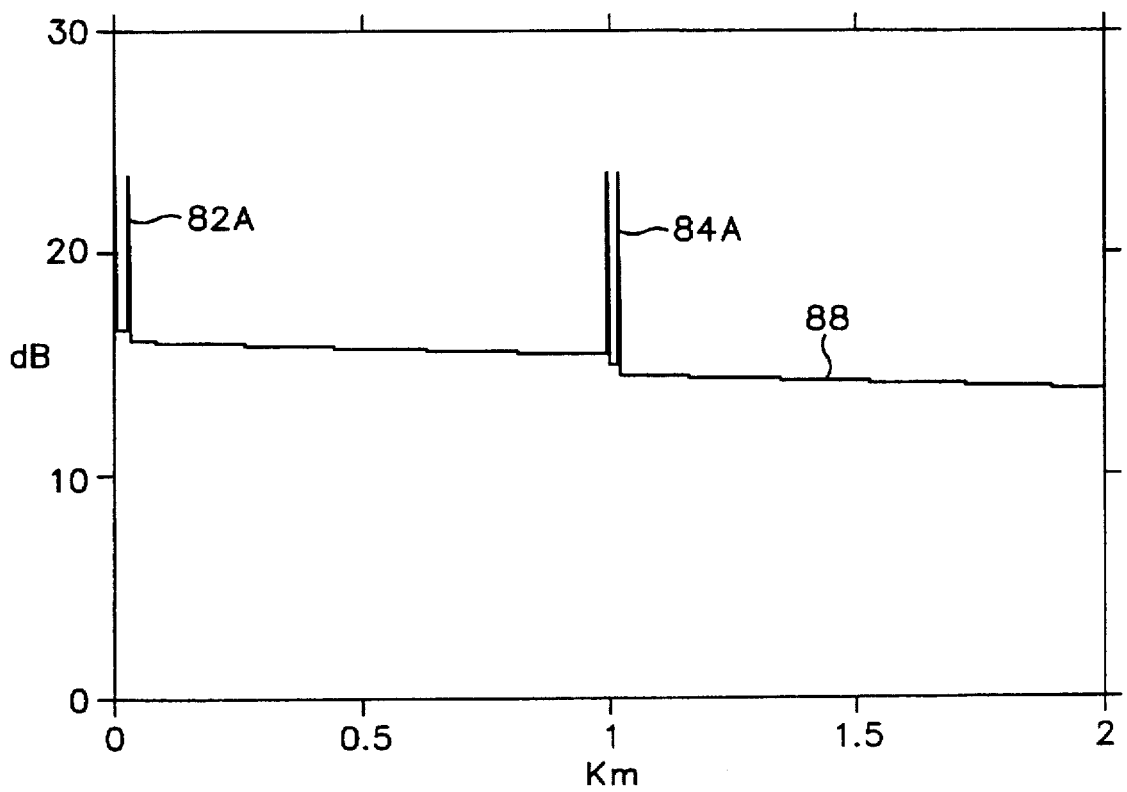
FIG. 3C is a representative waveform trace of composite waveform data having 850 nm waveform data modified by adding the fiber slope difference between the 1300 nm and the 850 nm data added to the 850 nm data according to the present invention.
Figure 3A:
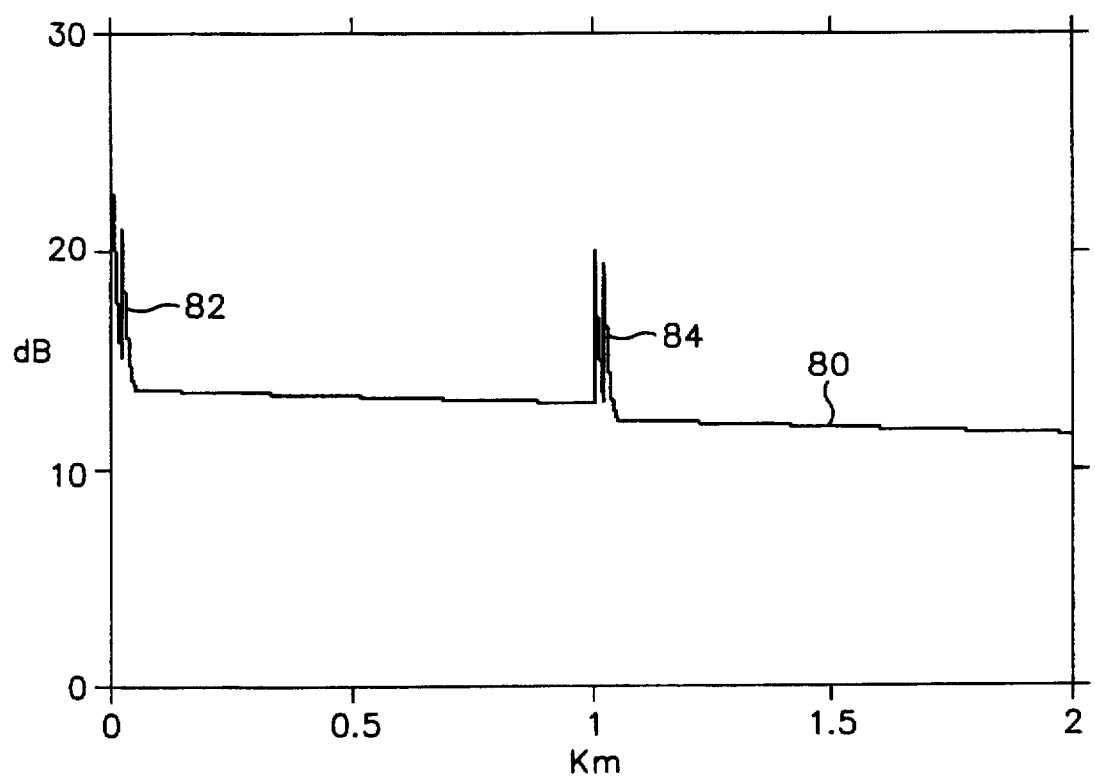
FIG. 3A is a representative waveform trace of waveform data acquired using a 1300 nm multimode optical source according to the present invention.
Figure 3B:
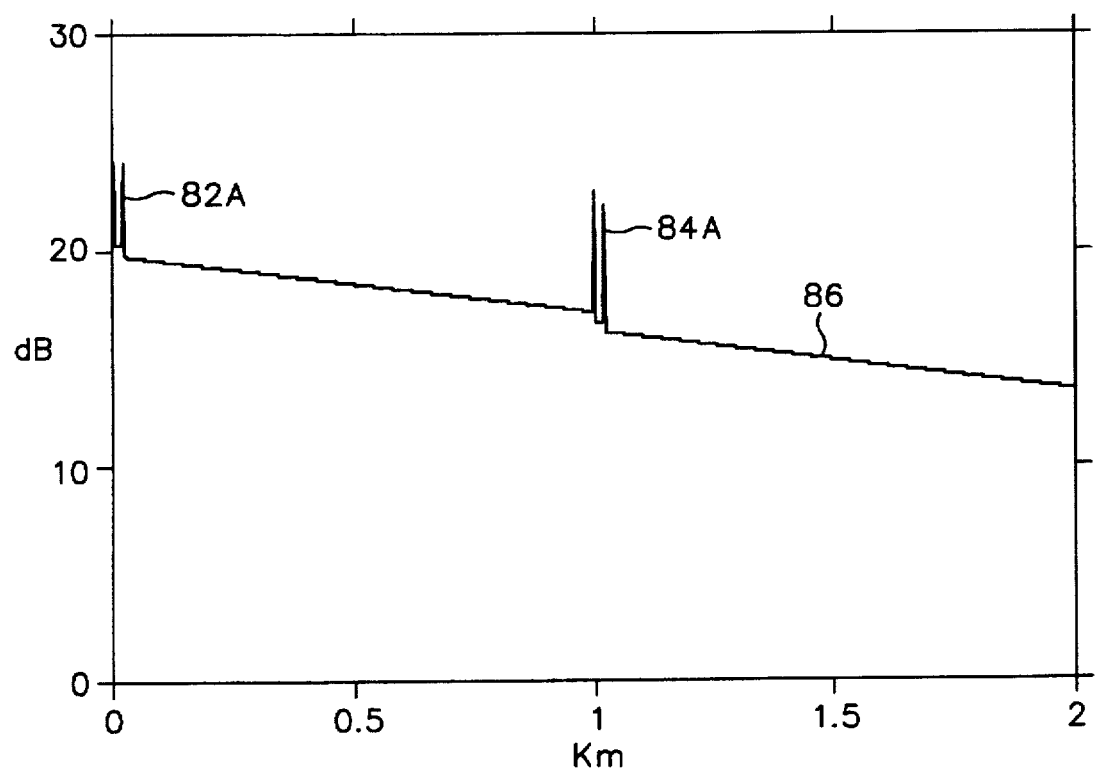
FIG. 3B is a representative waveform trace of waveform data acquired using a 850 nm multimode optical source according to the present invention.

FIG. 3A show a representative waveform trace 80 on the display 60 of OTDR 10 for the first waveform segment data acquired using the 1300 nm optical transmitter 18. The vertical scale for FIG. 3A and the subsequent FIGS. 3B and 3C is in dB and the horizontal scale is representatively shown in kilometers. The horizontal scale may also be shown in feet or miles. The waveform trace 80 shows grouped events 82 and 84 that are smeared together as a consequence of the germanium or InGaAs APD 30. The fiber slope is measured in this trace. FIG. 3B shows a representative waveform trace 86 on the display 60 of OTDR 10 for the first waveform segment data acquired using the 850 nm optical transmitter 18A. The grouped events 82A and 84A corresponding to the same events in the trace 80 are easily resolvable as a consequence of the better performance of the silicon APD 30A. In this example, the pulse width of the 850 nm optical pulses of the optical transmitter 18A is 2 meters and the sample spacing is 0.5 meters. The fiber slope of the 850 nm trace 86 is much larger than that at 1300 nm but the event loss is the same. FIG. 3C show a representative waveform trace 88 on the display 60 of OTDR 10 for the composite waveform segment data using the 850 nm waveform segment data that has been modified by adding the fiber slope difference between the 1300 nm data and the 850 nm data to the 850 nm data. The fiber slope of the 850 nm trace matches the 1300 nm trace 80 while maintaining the excellent dead zone characteristics of the grouped events 82A and 84A of the 850 nm data and providing accurate splice loss and fiber slope measurements.

The event detection routine also determines the starting point for the acquisition of waveform data for the next waveform segment based on the location of events in the waveform segment data and the location where the waveform segment data falls to close to the instrument noise floor based on a threshold, such as 0.05 dB peak-to-peak. The routine for determining the starting point for the next waveform segment backs up a fixed distance to allow for overlap of the next waveform segment. The data is scaled further back until the data is out of the noise floor and not on an event. This information is passed over the serial link 46 to the DAS 12, along with the laser wavelength, pulsewidth and sample spacing parameters for the next waveform segment acquisition. The controller 50 calls another routine to transfer the data stored in the buffer of RAM 54 into a contiguous block of memory in RAM 54 as an array of waveform data points.

In the preferred embodiment of the invention, waveform data for subsequent waveform segments is acquired using the optical transmitter 18 operating at 1300 nm. Alternately, the optical transmitter 18A, operating at 850 nm, may be used to acquire the waveform data for subsequent waveform segments to the maximum measurement range of the 850 nm optical transmitter 18A. The 1300 nm optical transmitter 18 is then used to acquire waveform data for the waveform segments to the limit of the 1300 nm optical transmitter 18 or the end of the test fiber 22. In the preferred and alternative embodiments, the acquisition and display of waveform data for the waveform segments is performed in accordance with the teaching of U.S. Pat. No. 5,528,356.

An alternative to generating the composite waveform data having waveform segments generated using the 1300 nm and 850 nm optical transmitters is to replace grouped events detected during the acquisition of waveform data using the 1300 nm optical transmitter with waveform data acquired using the 850 nm optical transmitter. As in the preferred embodiment, the fiber slope difference between the waveform data acquired at 1300 nm and 850 nm is determined and stored in RAM 54. The controller 50 passes parameter information relating to the pulsewidth, sample spacing and starting point to the DAS 12 via the serial link 46. The acquisition of waveform segment data using the 1300 nm optical source proceeds as described in U.S. Pat. No. 5,528,356 with the acquired and averaged waveform data for each waveform segment being passed to the system processor 50 over serial link 46. The system processor 50 calls a routine, such as the routine for determining the presence and characterizing events in the waveform data previously described, for detecting the presence and location of grouped events in the waveform data. A grouped event may be characterized as being composed of events that are close enough together that they cannot be individually resolved, i.e. measured.

The controller 50 passes new parameter information to the DAS 12 that includes switching to the 850 nm optical transmitter, the beginning and ending location of the grouped event, the pulsewidth for the optical transmitter and the sample spacing. The controller 38 accesses the routine stored in ROM 42 for initiating the acquisition of waveform data over the grouped event at the 850 nm wavelength. The acquired and averaged data is passed back to the controller 50 over serial link 46 where the stored fiber slope difference is added to the 850 nm wavelength data and the modified data is stored in RAM 54 replacing the 1300 nm grouped event data previously acquired. It is understood that one of the advantages of using an 850 nm optical transmitter for acquiring waveform data is the OTDR's ability to receive an equivalent amount of Raylaigh scattered optical energy from the test fiber when using a narrower pulsewidth as compared to the 1300 nm optical transmitter operating at a longer pulsewidth. This produces less event dead zone at 850 nm than at 1300 nm. The effects of less dead zone at 850 nm is better resolution around the grouped events at 850 nm than at 1300 nm. Because of the better dead zone resolution at 850 nm and the ability to use narrower optical pulses, denser sample spacing can be employed to advantage to improve measurement accuracy. The system processor 50 manipulates the waveform data previously acquired at 1300 nm and the new waveform data acquired at 850 nm to produce an array of waveform data points in a contiguous block of memory in RAM 54. It is also understood that the measurement range of the 850 nm optical transmitter is less than that of the 1300 nm optical transmitter. Therefore, grouped events detected in the 1300 nm waveform data that are located past the measurement range of the 850 nm optical transmitter may not be characterized using the 850 nm optical transmitter.

An alternative to the above described grouped event detection and characterization using both the 1300 nm and 850 nm optical transmitters is to acquire and store all of the waveform data segments at the 1300 nm wavelength for the test fiber 22. As previously described, waveform data is acquired at both wavelengths prior to the acquisition of the waveform data segments at 1300 nm for determining the fiber slope difference at the two wavelengths. The controller 50 accesses the grouped event detection routine to determine the presence and location of any grouped events in the acquired data. If a grouped event is detected, the controller 50 passes the appropriate parameter information to the DAS 12 for acquiring waveform data over the grouped event at the 850 nm wavelength. The 850 nm grouped event data is passed from the DAS 12 to the controller 50 where in the slope difference is added to the 850 nm data and the data stored in RAM 54 replacing the grouped event data acquired at 1300 nm.

Figure 4A:
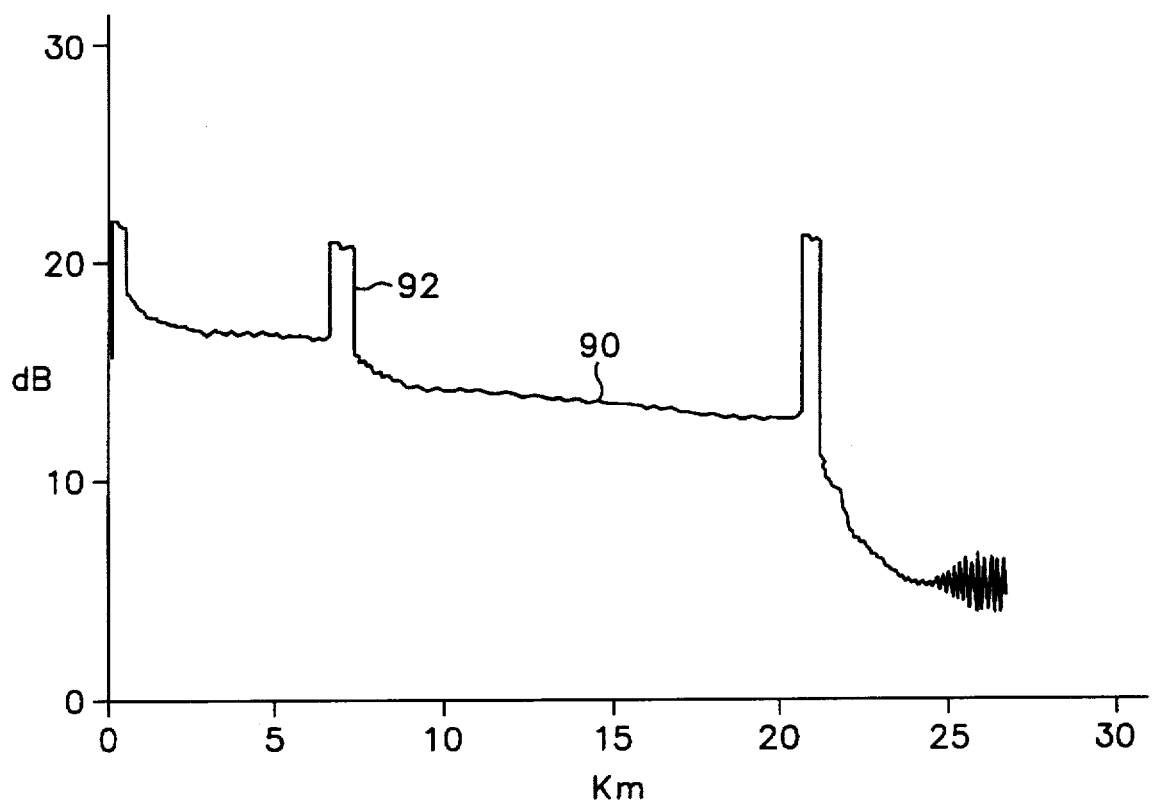
FIG. 4A is a representative waveform trace of waveform data acquired using a 1300 nm multimode optical source showing a grouped event according to the present invention.
Figure 4B:
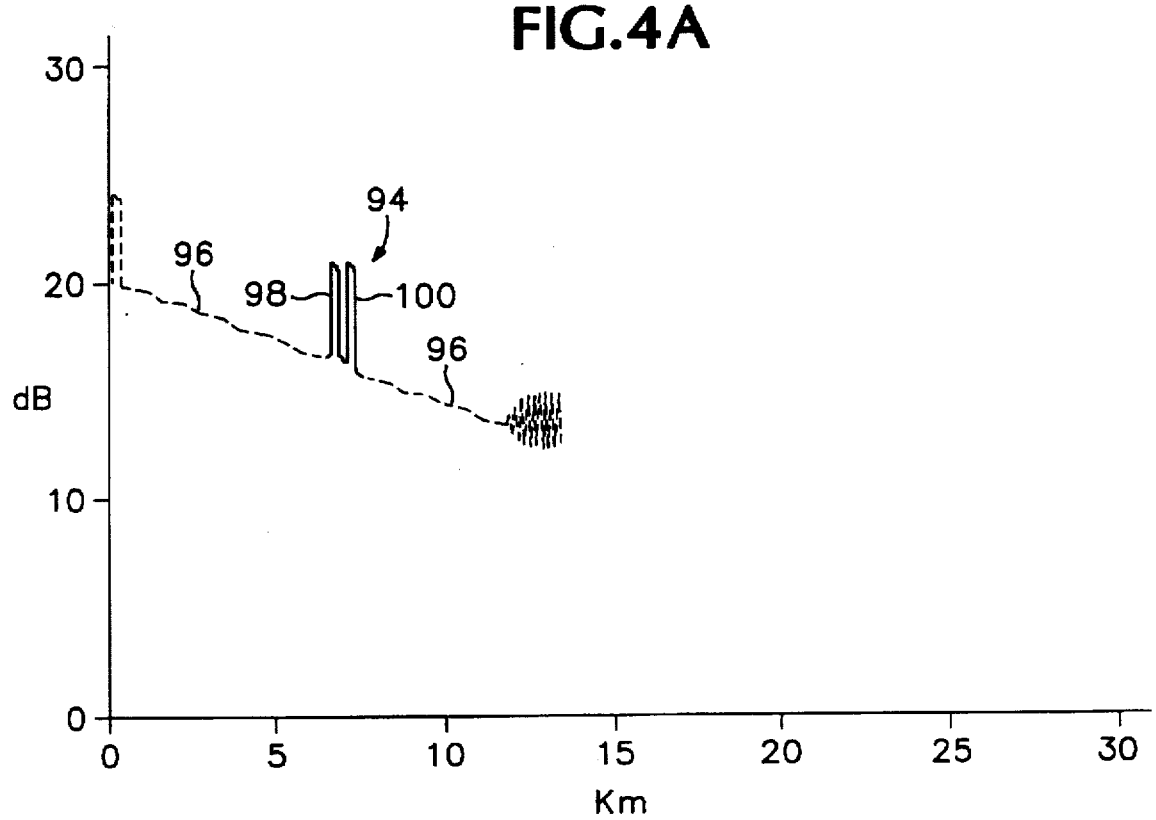
FIG. 4B is a representative waveform trace of waveform data acquired using a 850 nm multimode optical source showing a grouped event according to the present invention.
Figure 4C:
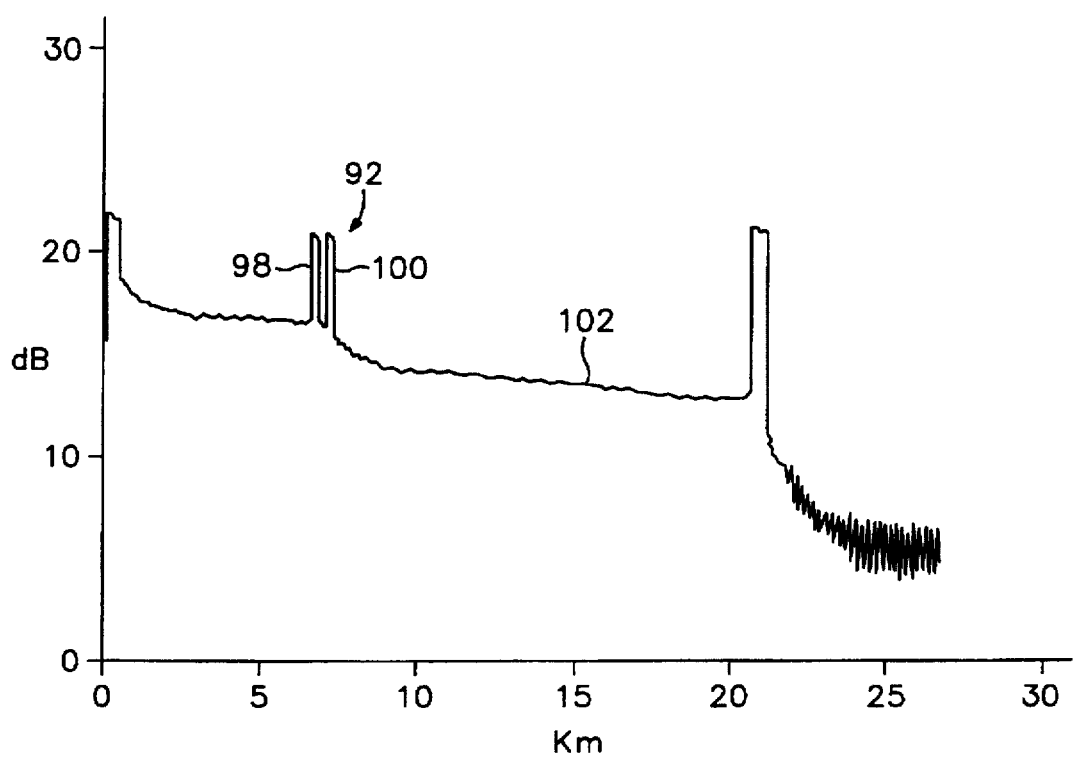
FIG. 4C is a representative waveform trace of composite waveform data having 850 nm waveform data modified by adding the fiber slope difference between the 1300 nm and the 850 nm data added to the 850 nm data and replacing the 1300 nm grouped event data according to the present invention.

FIGS. 4A and 4B show representative waveform traces of acquired waveform data at 1300 nm and 850 nm and FIG. 4C shows a representative waveform trace of the composite waveform data of the 1300 nm data combined with the modified 850 nm data for the just described embodiments. The 1300 nm waveform trace 90 of FIG. 4A shows a grouped event 92. FIG. 4B shows the solid waveform trace 94 of the waveform data acquired at 850 nm over the region of the grouped event 92. The dashed waveform trace 96 shows that the fiber slope of the 850 nm data is greater than the 1300 nm data. The waveform data acquired at 850 nm resolves the grouped event 92 by launching optical pulses with a narrower pulse width and smaller sample spacing than the waveform data acquired at 1300 nm. The grouped event 92 is shown to contain two reflective events 98 and 100. Even though the fiber slope of the 850 nm waveform data is much larger than the 1300 nm waveform data, the overall loss of the two reflective events 98 and 100 is the same as the overall loss of the grouped event 92. FIG. 4C show the waveform trace 102 of the composite waveform data having the 850 nm grouped event waveform data modified by adding the fiber slope difference to the 850 nm data replacing the 1300 nm grouped event data 92. The resulting composite waveform data produces the waveform trace 102 having a uniform fiber slope with the grouped events being resolved with greater two point resolution and improved attenuation and event dead zone resolution.

An improved multimode optical time domain reflectometer has been described that provides improved attenuation and event dead zone two point resolution for 1300 nm multimode operation. The OTDR includes an acquisition system having 1300 nm and 850 nm lasers for launching optical pulses into a fiber under test. The optical return signals from the test fiber for the respective optical wavelengths are coupled to optical receivers responsive to the respective wavelengths for converting the respective optical return signals into electrical signals for acquiring waveform data representative of the optical return signal at the respective wavelengths. A processor receives the respective waveform data for the two wavelengths for determining a difference in fiber slope between the optical return signal at the two wavelengths and adds the fiber slope difference to the 850 nm waveform data for producing composite waveform data having a uniform fiber slope for the waveform data acquired at 1300 nm and 850 nm.

It will be obvious to those having skill in the art that many changes may be made to the details of the above-described embodiments of this invention without departing from the underlying principles thereof. Accordingly, the scope of the present invention should, therefore, be determined only by the following claims.

What is claimed is:

1. A multimode optical time domain reflectometer for testing a multimode optical fiber comprising:

an acquisition system having first and second multimode optical transmitters operating at first and second wavelengths for launching optical pulses into the multimode optical fiber under test for generating optical return signals corresponding to the first and second wavelengths of the launched optical pulses, and first and second optical receivers responsive to the respective wavelengths for converting the respective optical return signals into electrical signals for acquiring waveform data representative of the optical return signals at the respective wavelengths; and a processor receiving the waveform data representative of the optical return signals at the first and second wavelengths for determining a difference in fiber slopes between the optical return signals at the first and second wavelengths and adding the fiber slope difference to the waveform data of the second optical return signal for producing composite waveform data having a uniform fiber slope for the waveform data acquired at the first and second wavelengths.

2. The multimode optical time domain reflectometer as recited in claim 1 wherein the acquisition system acquires waveform data over a first waveform segment using the second optical transmitter wavelength and a second waveform segment using the first optical transmitter wavelength with each waveform segment being generated using a different optical pulsewidth, a different sample spacing and a different staring point and the processor adding the fiber slope difference to the waveform data of the first waveform segment for producing the composite waveform data having the uniform fiber slope for the waveform data acquired at the first and second wavelengths.

3. The multimode optical time domain reflectometer as recited in claim 1 wherein the processor evaluates the waveform data acquired at the first wavelength for determining an approximate location of at least one anomalous event in the fiber under test for providing acquisition parameters to the acquisition system for acquiring waveform data at the second wavelength over the anomalous event location and replacing the portion of the waveform data over the anomalous event location acquired at the first wavelength with the waveform data acquired at the second wavelength having the fiber slope difference added thereto for producing the composite waveform data having the uniform fiber slope for the waveform data acquired at the first and second wavelengths.

4. The multimode optical time domain reflectometer as recited in claim 1 further comprising a display device coupled to a display controller for receiving and displaying the composite waveform data as a waveform trace on the display device.

5. The multimode optical time domain reflectometer as recited in claim 1 wherein the first multimode optical transmitter has a wavelength in the range of about 1300 nanometers.

6. The multimode optical time domain reflectometer as recited in claim 1 wherein the second multimode optical transmitter has a wavelength in the range of about 850 nanometers.

7. The multimode optical time domain reflectometer as recited in claim 1 wherein the first optical receiver has a germanium avalanche photodetector.

8. The multimode optical time domain reflectometer as recited in claim 1 wherein the first optical receiver has a InGaAs avalanche photodetector.

9. The multimode optical time domain reflectometer as recited in claim 1 wherein the second optical receiver has a silicon avalanche photodetector.

10. A method of generating waveform data for displaying as a waveform trace on a display device in a multimode optical time domain reflectometer launching optical pulses into a fiber under test for generating optical return signals from the test fiber comprising the steps of:

a) acquiring waveform data representative of the optical return signals using first and second multimode optical transmitters operating at first and second wavelengths for launching optical pulses into the fiber under test to generate optical return signals corresponding to the first and second wavelengths of the launched optical pulses and converting the respective optical return signals into electrical signals representative of the optical return signals using first and second optical receivers responsive to the respective wavelengths of the launched optical pulses; and b) processing the waveform data representative of the optical return signals at the first and second wavelengths for determining a difference in fiber slope between the optical return signals at the first and second wavelength and modifying the fiber slope of the second optical return signal by adding the difference between the fiber slopes to the waveform data of the second optical return signal for producing composite waveform data having waveform data acquired at both the first and second wavelengths.

11. The method of generating waveform data in a multimode optical time domain reflectometer as recited in claim 10 wherein the acquiring and processing steps further comprise the steps of:

a) acquiring waveform data at the second wavelength over a first waveform segment using a first pulsewidth optical pulse, sample spacing and staring point;

b) adding the fiber slope difference to the acquired waveform data at the second wavelength over the first waveform segment; and c) acquiring waveform data at the first wavelength over a second waveform segment using a different pulsewidth optical pulse, sample spacing and starting point for producing the composite waveform data having waveform data acquired at both the first and second wavelengths.

12. The method of generating waveform data in a multimode optical time domain reflectometer as recited in claim 10 wherein the acquiring and processing steps further comprise the steps of:

a) evaluating the waveform data at the first wavelength for determining an approximate location of at least one anomalous event in the fiber under test for providing acquisition parameters to the acquisition system;

b) acquiring waveform data at the second wavelength over the anomalous event location; and c) replacing the portion of the waveform data over the anomalous event location acquired at the first wavelength with the waveform data over the anomalous event acquired at the second wavelength having the fiber slope difference added thereto for producing the composite waveform data having the uniform fiber slope for the waveform data acquired at the first and second wavelengths.

13. The method of generating waveform data in a multimode optical time domain reflectometer as recited in claim 10 further comprising the step of displaying the composite waveform data as a waveform trace on the display device.

* * * * *